US008600850B2

(12) United States Patent
Zabawskyj et al.

(10) Patent No.: US 8,600,850 B2
(45) Date of Patent: Dec. 3, 2013

(54) FEEDBACK LOOP FOR DYNAMIC NETWORK RESOURCE ALLOCATION

(75) Inventors: Bohdan K. Zabawskyj, Woodbridge (CA); Rushabhdev Gudka, Scarborough (CA); Vinay Kumar, Brampton (CA); Ian Hendry, Georgetown (CA)

(73) Assignee: Redknee Inc., Mississauga, Ontario (CA)

( * ) Notice: Subject to any disclaimer, the term of this patent is extended or adjusted under 35 U.S.C. 154(b) by 0 days.

(21) Appl. No.: 13/515,101

(22) PCT Filed: Dec. 10, 2009

(86) PCT No.: PCT/CA2009/001809
§ 371 (c)(1),
(2), (4) Date: Aug. 13, 2012

(87) PCT Pub. No.: WO2011/069228
PCT Pub. Date: Jun. 16, 2011

(65) Prior Publication Data
US 2013/0046665 A1    Feb. 21, 2013

(51) Int. Cl.
*G06F 15/173* (2006.01)
(52) U.S. Cl.
USPC .......... 705/34; 705/304; 705/412; 705/14.66; 370/352; 370/10; 709/226
(58) Field of Classification Search
USPC ............ 705/34, 304, 412, 347; 370/352, 230, 370/401
See application file for complete search history.

(56) References Cited

U.S. PATENT DOCUMENTS

| | | | |
|---|---|---|---|
| 6,990,666 B2 * | 1/2006 | Hirschfeld et al. | 718/104 |
| 7,747,461 B2 | 6/2010 | Sheth et al. | |
| 7,965,693 B2 * | 6/2011 | Jiang et al. | 370/338 |
| 7,979,512 B2 * | 7/2011 | Chandrasekhar et al. | 709/219 |
| 8,005,491 B2 * | 8/2011 | Dennert et al. | 455/458 |
| 2008/0049639 A1 * | 2/2008 | Wiley et al. | 370/252 |
| 2008/0059635 A1 | 3/2008 | Seiferth et al. | |
| 2009/0109959 A1 * | 4/2009 | Elliott et al. | 370/352 |
| 2009/0215411 A1 * | 8/2009 | Tucker et al. | 455/90.2 |
| 2009/0288140 A1 * | 11/2009 | Huber et al. | 726/2 |
| 2011/0137791 A1 | 6/2011 | Zabawskyj et al. | |
| 2011/0246586 A1 | 10/2011 | Steele | |
| 2012/0036559 A1 | 2/2012 | Zabawskyj et al. | |

OTHER PUBLICATIONS

International Search Report of the International Searching Authority from corresponding Patent Cooperation Treaty (PCT) Application No. PCT/CA2009/001809, mailed Feb. 22, 2010.

* cited by examiner

*Primary Examiner* — Vanel Frenel
(74) *Attorney, Agent, or Firm* — Gardner, Linn, Burkhart & Flory, LLP

(57) ABSTRACT

A system, apparatus and method for dynamic resource allocation is provided, where a network resource shared by a plurality of electronic devices having unique service profiles and unique billing profiles is monitored. Allocation of the shared network resource as well as the service profiles and billing profiles are dynamically modified.

17 Claims, 7 Drawing Sheets

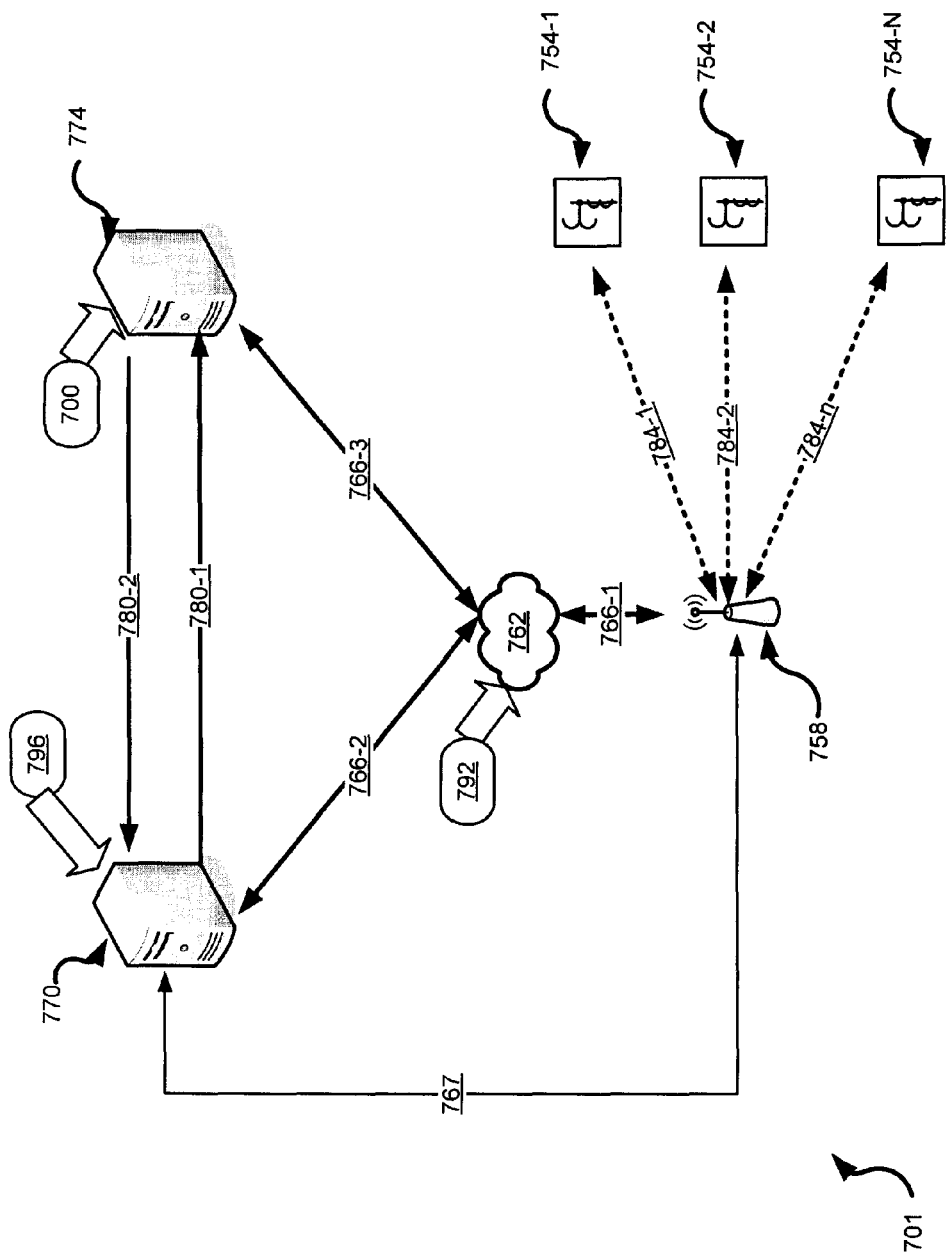

FEEDBACK LOOP FOR DYNAMIC NETWORK RESOURCE ALLOCATION

FIELD

The present specification relates generally to networked computing and more specifically relates to a feedback loop for dynamic network resource allocation.

BACKGROUND

Mobile computing devices are increasingly being used to access content hosted on the Internet or other type of network. Different computing devices can be allocated different service levels, while at the same time network congestion can change unpredictably, thereby compromising allocated services levels.

SUMMARY

An aspect of the specification provides a method for dynamic allocation of network resources comprising:
receiving a service profile for each of a plurality of devices sharing a network resource;
receiving a billing profile for each of the plurality of devices; and
repeating:
receiving traffic profiles over the network resource for the plurality of devices;
managing the network resource according to the service profile and the billing profile if the network resource is fully utilized by the traffic profiles; and,
dynamically modifying at least one of the service profile and the billing profile for at least one of the devices if the network resource is under-utilized by the traffic profile or if the network resource would be over-utilized by the traffic profiles;
until the plurality of devices no longer continue to share the network resource.

The dynamically modifying can comprise increasing or reducing an overall bit-rate cap or data volume cap in a service profile for at least one of the devices. It should be noted that the service profile can be based on actual consumption at the device, or it can be based on the consumption (e.g. bandwidth) of the network resource itself.

The dynamically modifying can further comprise increasing or decreasing a rate or a charge in a billing profile for the at least one of the devices.

The method can further comprise generating a prioritization list of each of the devices; the prioritization list defining an order in which of the devices is subject to the dynamically modifying. One of the devices at a first end of the list can be a first device to be subject to the dynamically modifying if the network resource would be over-utilized by the traffic profiles.

The dynamically modifying can also comprise increasing an overall bit-rate cap or data volume cap for the one of the devices at the first end of the list. It should be noted that the service profile can be based on actual consumption at the device, or it can be based on the consumption (e.g. bandwidth) of the network resource itself.

The increasing can be configured to fully utilize a remainder of a capacity of the network resource.

One of the devices at a first end of the list can be a first device to be subject to the dynamically modifying if the network resource would be under-utilized by the traffic profiles.

The dynamically modifying can comprise decreasing an overall bit-rate cap or data volume cap for the one of the devices at the first end of the list.

The decreasing can be configured to bring the traffic profiles into alignment with full utilization of a capacity of the network resource.

Another aspect of the specification provides an apparatus for dynamic allocation of network resources comprising: a network interface configured to receive a service profile for each of a plurality of devices sharing a network resource and to receive a billing profile for each of the plurality of devices; and a processor connected to the network interface and configure to repeat: receiving traffic profiles over the network resource for the plurality of devices; managing the network resource according to the service profile and the billing profile if the network resource is fully utilized by the traffic profiles; and, dynamically modifying at least one of the service profile and the billing profile for at least one of the devices if the network resource is under-utilized by the traffic profile or if the network resource would be over-utilized by the traffic profiles; until the plurality of devices no longer continue to share the network resource.

BRIEF DESCRIPTION OF THE DRAWINGS

FIG. 7 shows a schematic representation of a system with a feedback loop for dynamic resource allocation as applied to a utility distribution network.

DETAILED DESCRIPTION OF THE EMBODIMENTS

Figure 1:
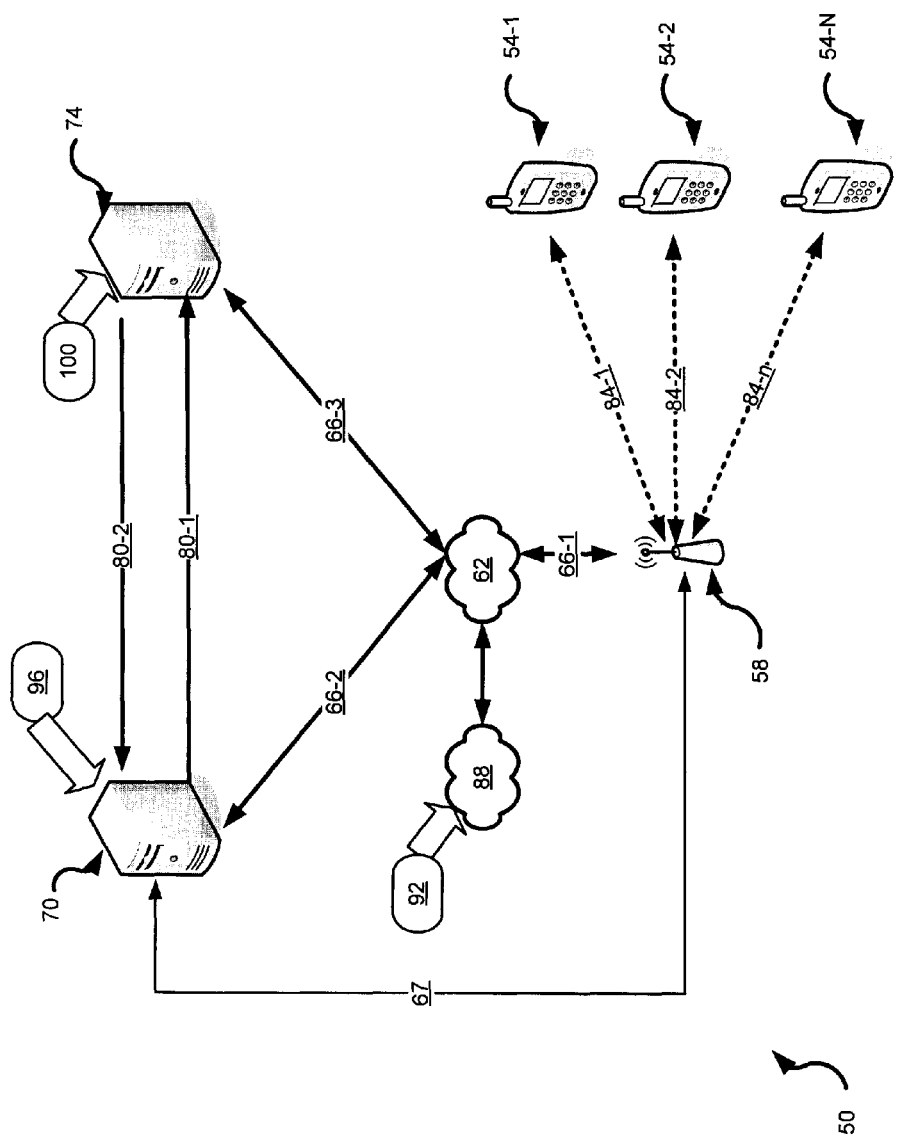
FIG. 1 shows a schematic representation of a system with a feedback loop for dynamic resource allocation.

It is to be understood that the embodiments discussed herein are non-limiting examples of certain implementations. Variations on those examples are contemplated. Referring now to FIG. 1, a system with a feedback loop for dynamic resource allocation is indicated generally at 50. In a present embodiment system 50 comprises a plurality of mobile computing devices 54-1, 54-2 . . . 54-$n$ (collectively, computing devices 54, and generically, computing device 54. This nomenclature is used elsewhere).

At least one wireless base station 58 interconnects computing device 54 and a communication network 62. A first backhaul link 66-1 connects base station 58 to network 62. A second backhaul link 66-2 connects network 62 to a policy server 70 and a third backhaul link 66-3 connects network 62 to billing server 74. Policy server 70 is also configured to send policy data to billing server 74 via a first link 80-1 and to receive billing data from billing server 74 via a second link 80-2. Policy server 70 is also configured to receive resource utilization data from and send policy instructions to network elements in network 62 via link 66-2. Policy server 70 is also configured to receive resource utilization data from and send policy instructions to base station 58 via link 67. Billing server 74 is also configured to receive resource utilization data from and send instructions to network elements in network 62 via link 66-3. It should be noted that links 80 can be implemented via a single physical connection, but are illustrated as logically separate for ease of description of the teachings herein. It should also be noted that the functionality accorded by link 67 can be implemented via link 66-1, network 62, and link 66-2 but are illustrated as logically separate for ease of description of the teachings herein.

A bearer path 84, typically wireless, is used to interconnect base station 58 with each computing device 54. In a present exemplary embodiment, bearer path 84 can be based on one or more protocols, including without limitation, Global System for Mobile communications (GSM), General Packet Radio Service (GPRS), Enhanced Data Rates for GSM Evolution (EDGE), the Third-generation mobile communication system (3G), Evolution-Data Optimized (EVDO), High Speed Packet Data (HSPA), Long Term Evolution (LTE), Institute of Electrical and Electronic Engineers (IEEE) 802.11 (WiFi), IEEE 802.16 Worldwide Interoperability for Microwave Access (WiMax), IEEE 802.20 Mobile Broadband Wireless Access (MBWA) or other wireless protocols. In variations, path 84 can be wired. It is also contemplated that each device 54 can be configured to use a plurality of different protocols by using different radios therein.

Network 62 can be implemented using public land mobile network (PLMN) infrastructures that support base station 52, policy server 70 and billing server 74. Network 62 thus further connects to a data network 88 such as the Internet, such that content 92 hosted on data network 88 is accessible to devices 54 via network 62, and also so that devices 54 can send content to other computers (including other computing devices) (not shown) connected to data network 88.

Computing device 54 can be any type of computing device that can be used in a self-contained manner and to interact with content available over network 88. Interaction includes displaying of information on computing device 54 as well as to receive input at computing device 54 that can in turn be sent back over network 62 or network 88 or both. Contemporary versions of device 54 can typically be used for both wireless voice (e.g. telephony) and wireless data (e.g. email, web browsing, text, video streaming, audio streaming, application downloading) communications. In a present non-limiting exemplary embodiment, computing device 54 can be a mobile computing device with the combined functionality of a personal digital assistant, a cell phone, camera, video recorder, email paging device, and an application launcher. (Although variants on device 54 can include a palm top computer or laptop computer with a reduced screen such as an ASUS EEE from ASUSTek Computer Inc. of Taiwan). Many known cellular telephone models, or variants thereof, are suitable for the present embodiment.

In a non-limiting structural example, device 54 thus includes a plurality of input mechanisms such as a keyboard, a pointing device, and a microphone. A pointing device can be implemented as a track wheel, trackball or the like. Other input devices, such as a touch screen are also contemplated. Input from input mechanisms are received at a processor that is configured to communicate with a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 54 as described herein are typically maintained, persistently, in the non-volatile storage unit and used by the processor which makes appropriate utilization of volatile storage during the execution of such programming instructions. It should be understood that the non-volatile storage unit and volatile storage unit are non-limiting examples of computer readable media which can store programming instructions that are executable on the device's processor. Such computer readable media can also comprise removable non-volatile storage.

The processor of device 54 is in turn is also configured to control various output mechanisms, such as a speaker and a display. The device's processor also contains at least one network interface, which are implemented in a present embodiment as radios configured to communicate over bearer path 84. In general, it will be understood that the device's interface(s) is (are) configured to correspond with the network architecture that defines a particular bearer path 84. It should be understood that in general a wide variety of configurations for device 54 are contemplated.

In a present embodiment, device 54 is also configured to maintain various applications such as, by way of non-limiting example, web browsers, streaming media players, telephony voice applications, or instant message applications or all of them.

Figure 2:
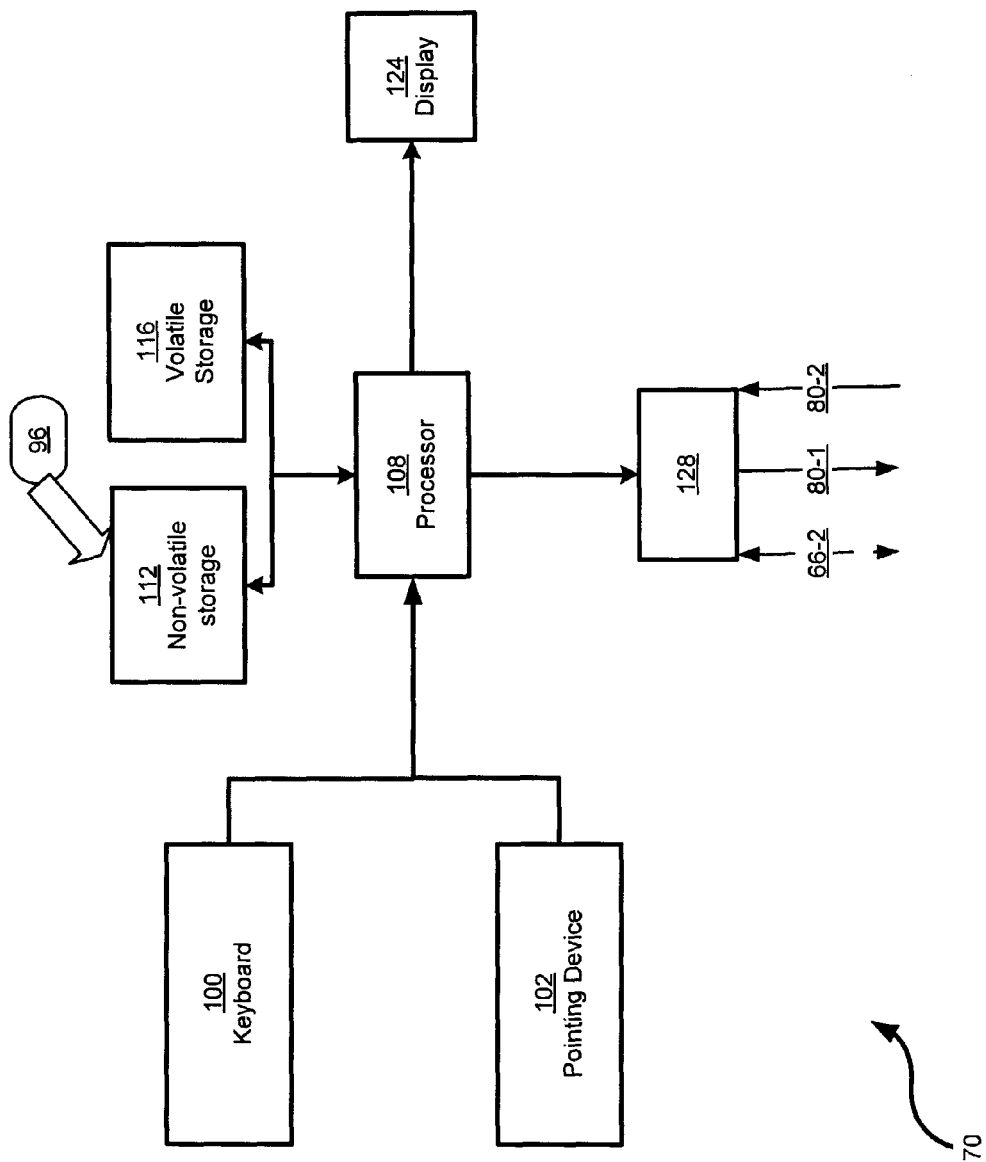
FIG. 2 shows a schematic representation of the policy server of the system of FIG. 1.
Figure 3:
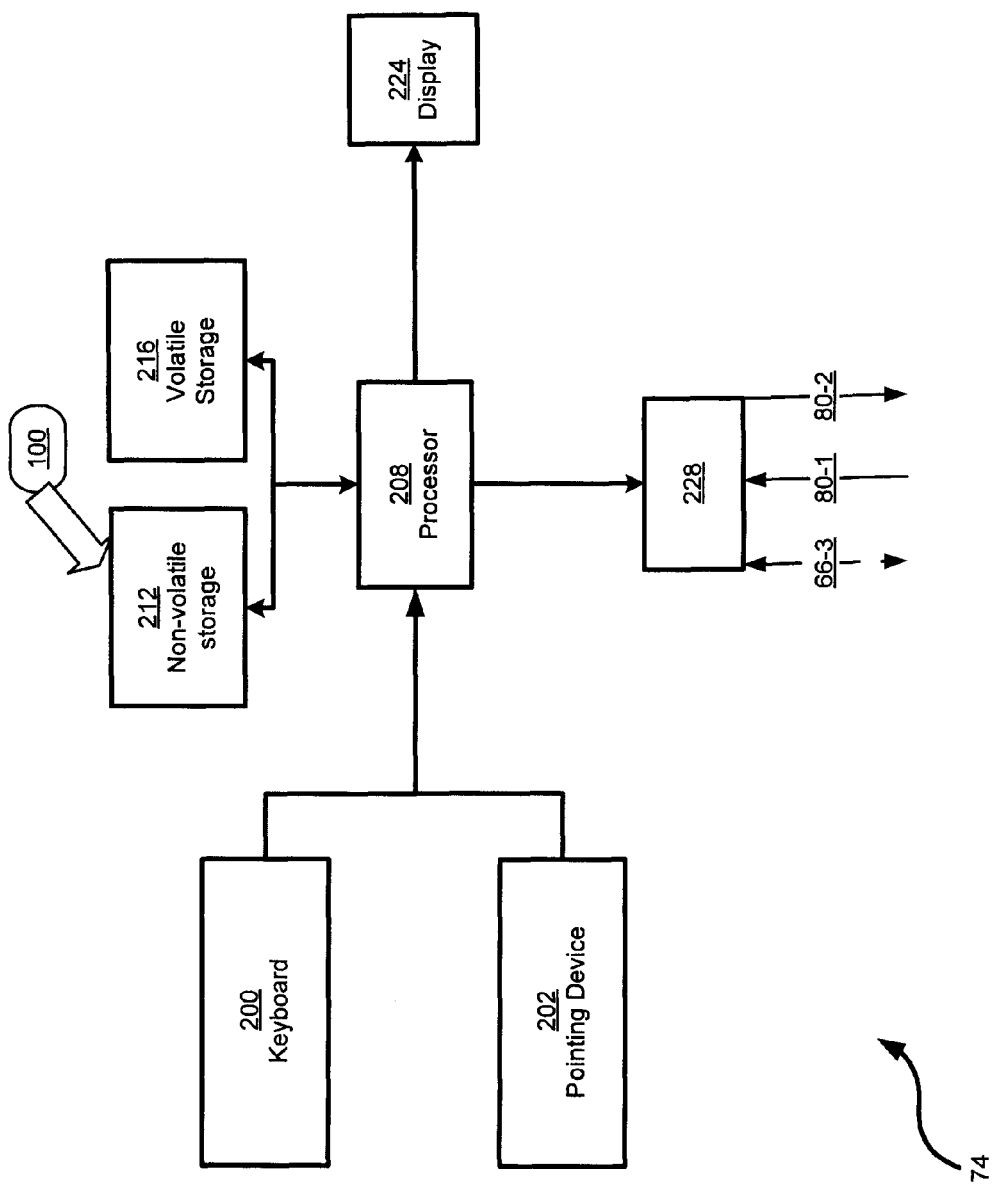
FIG. 3 shows a schematic representation of the billing server of the system of FIG. 1.

Referring to FIG. 2, server 70 can be based on any well-known server environment including various input devices such as a keyboard 100 and a pointing device 102 can be used to provide input to one or more central processing units 108. Server 70 can include a module that houses the one or more central processing units 108, as well as volatile storage 116 (e.g. random access memory), non-volatile storage 112 (e.g. hard disk devices) and network interfaces 128 to allow server 70 to communicate over network 62 and with server 74. Various output devices such as a display 124 that are controlled by the one or more central processing units 108 can also be provided. For example, server 70 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments are contemplated. For example, server 70 can be a Policy and Charging Rules Function (PCRF) server per the 3rd Generation Partnership Project (3GPP) and 3rd Generation Partnership Project 2 (3GPP2) standards, Resource and Admission Control Subsystem (RACS) server per the European Telecommunications Standards Institute (ETSI) The Telecoms & Internet converged Services & Protocols for Advanced Networks (TISPAN) standards, Policy Decision Physical Entity (PD-PE) per International Telecommunication Union (ITU) standards, Packet-Cable™ Multimedia (PCMM) policy server per Data Over Cable Service Interface Specification (DOCSIS) CableLabs standards, or Bandwidth Manager server per MultiService Forum (MSF) standards. Referring to FIG. 3, server 74 can be based on any well-known server environment including various input devices such as a keyboard 200 and a pointing device 202 can be used to provide input to one or more central processing units 208. Server 74 can include a module that houses the one or more central processing units 208, as well as volatile storage 216 (e.g. random access memory), non-volatile storage 212 (e.g. hard disk devices) and network interfaces 228 to allow server 74 to communicate over network 62 and with server 70. Various output devices such as a display 224 that are controlled by the one or more central processing units 208 can also be provided. For example, server 74 can be a Sun Fire V480 from Sun Microsystems, Inc. of Palo Alto Calif., running a UNIX operating system, and having four central processing units each operating at about nine-hundred megahertz and having about sixteen gigabytes of random access memory. However, it is to be emphasized that this particular server is merely exemplary, and a vast array of other types of computing environments are contemplated. For example, in a prepaid environment server 74 can be a Service Control Point (SCP), Authentication, Authorization and Accounting (AAA) server, On-line Charging Server (OCS), or billing server or the like according to standards for same.

Referring again to FIGS. 1 and 2, policy server 70 is configured to maintain, and enforce, a plurality of service profiles 96. Each service profile 96 corresponds to each device 54. It should be noted that each service profile 96 can be corresponded to a device 54 using an absolute identifier such as an International Mobile Equipment Identity (IMEI) that is uniquely associated with the device 54, or a relative identifier such as an International Mobile Subscriber Identity (IMSI) that can be dynamically associated with different devices 54. Other types of absolute identifiers include media access control (MAC) address (although recognizing the limitation that MAC addresses can duplicate) Other types of relative identifiers include a Mobile Subscriber ISDN Number (MISDN), internet protocol (IP) address, Billing Account Number (BAN), or an email address. Other types of absolute identifiers and relative identifiers will now occur to those skilled in the art.

Each service profile 96 can thus include any traffic parameter that regulates traffic to and from device 54 via network 62, and link 66-1 and path 84 respective to that profile. Traffic parameters can include an overall bit-rate cap or data volume cap over a predefined time period. Alternatively, or in addition, traffic parameters can be more granular, and include permissions for different content that may be carried over path 84 including, by way of example, restrictions on the use of specific protocols or codecs employed to transfer content such as video or auto streaming. Traffic parameters can also pertain to specific sessions or logical channels including packet data protocol (PDP) contexts. Content types can include data, text, instant messaging, voice, video, graphics, services and applications. Permissions for the same content type can be restricted based on providers; for example instant messaging via Yahoo!™ can be permitted, while instant messaging from Google™ may not permitted. Permissions need not be "on" or "off", but may be defined by bit-rates or caps or both. For example, instant messaging via Yahoo!™ can be permitted at a given capped bit-rate, or a given capped volume of data, or both, while instant messaging from Google™ can be permitted at a second given capped bit rate, or a second given capped volume of data, or both. Each service profile 96 can also include privacy settings for content. For example, for a location aware mapping application, service profile 96 can be configured to restrict, or permit, or only permit under certain criteria, the disclosure of the location of a respective device 54.

Policy server 70 is therefore also configured to have access to various attributes of each device 54 for which a service profile 96 exists, including but not limited to, presence, location and current traffic activities over its respective link 84. The policy server 70 is also configured to send instructions to appropriate network elements in network 62 or base station 58 to ensure that traffic over a respective link 84 conforms with the relevant policy.

Referring again to FIGS. 1 and 3, billing server 74 is configured to maintain, and enforce, a plurality of billing profiles 100. Each billing profile 100 corresponds to each device 54. Like each service profile 96, each billing profile can be corresponded to a device 54 using an absolute identifier or a relative identifier or both. It should be noted that in any event each service profile 96 and each billing profile 100 can be matched together for a given device 54.

Each billing profile 100 can thus include any billing parameter that regulates rating or charging or both of traffic to and from device 54 via network 62, link 66-1, and link 84. Thus, as used herein, billing refers to any action that comprises traffic rating, or traffic charging, or both. Traffic rating refers to establishing a unit of charge associated with a particular type of traffic. For example, voice call traffic over link 84 may be rated at five cents per minute. Traffic charging refers to a total charge that is applied to traffic over link 84. For example, voice call traffic that occurs over a two minute period would be charged ten cents (i.e. two times five cents equal ten cents). Billing profile 70 can also indicate "payment profile" or a credit score.

Billing parameters can include different rating or charging for different content that may be carried over path 84. As noted above, content types can include data, text, instant messaging, voice, video, graphics, services and applications. Rating for the same content type can be varied based on providers; for example instant messaging via Yahoo!™ can be rated at two cents per kilobyte, while instant messaging from Google™ may be rated at three cents per kilobyte. Charging can be done on a prepaid or post paid basis. Traffic rating and traffic charging amounts can be structured to vary for different times of day, or different days of the week, or based on whether or not a device 54 is "roaming", or calculated at different tiers based on whether traffic over link 84 exceeds a certain bit-rate cap or data volume cap.

Billing server 74 is therefore also configured to have access to various attributes of each device 54 for which a service profile 96 exists, including but not limited to, presence, location and current traffic activities over its respective link 84. The billing server 74 is also configured to send instructions to appropriate network elements in network 62 or base station 58 to ensure that traffic over a respective link 84 conforms with the relevant billing parameters. For example, if a particular device 54 has a prepaid charging structure, and that device 54 no longer has sufficient balance to carry further traffic, then billing server 74 can instruct the appropriate network elements in network 62, or base station 58, to cease carrying further traffic to or from that device 54.

Those skilled in the art will now appreciate that a plurality of different attributes can be used to define various service profiles 96 or billing profiles 100 or both. Further discussions on such attributes can be found in currently commonly owned applications WO2008/025157 entitled Method and System for Applying a Policy to Telecommunication Services and WP 2009/082806 entitled Policy-Based Communication System and Method and PCT/CA2008/001197 entitled Application of Policy for Subscriber Context, the contents of all of which are incorporated herein by reference.

Figure 4:
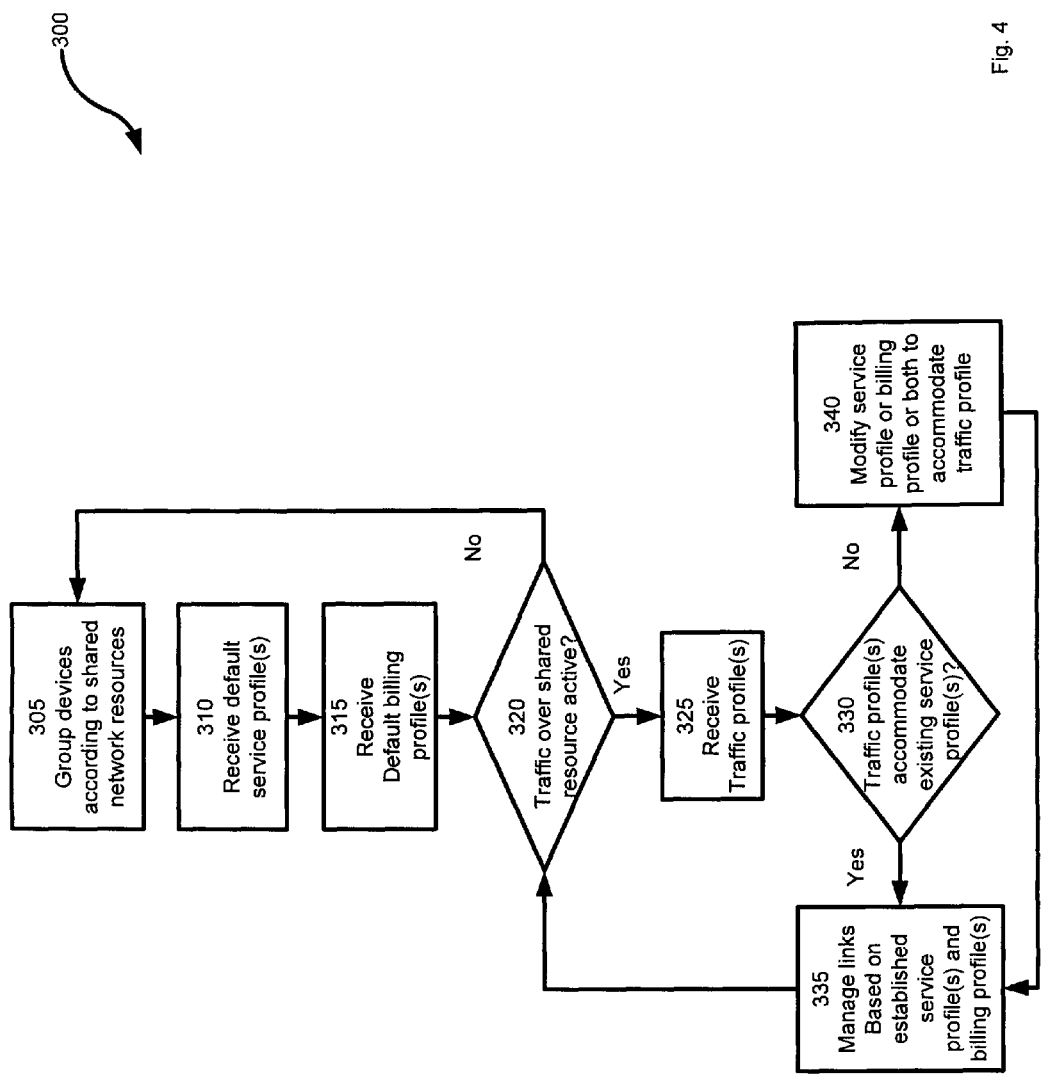
FIG. 4 shows a flow-chart depicting a method for dynamic resource allocation.

Referring now to FIG. 4, a flowchart depicting a method for dynamic resource allocation is indicated generally at 300. Method 300 can be implemented on system 50 or a suitable variation thereof.

Block 305 comprises grouping device according to a shared network resource. Block 305 can be performed by profile server 70 querying network elements in network 62 to ascertain which devices 54 are utilizing base station 58 or any other shared resource or network element in network 62 or link 66-1 (for example, media server, Gateway GPRS Support Node (GGSN), Serving Gateway GPRS Support Node (SGSN), back-haul link, router). The result of block 305 in system 50 is that devices 54-1, 54-2 and 54-$n$ are logically grouped. At this point it can be noted that system 50 is simplified in that only a single base station 58 and only three devices 54 are shown, but system 50 can be scaled to hundreds or thousands of base stations 58 or other network access points where a plurality of links, such as links 84, share a common physical network resource, such that contention for that resource between a plurality of devices 54 is possible. Those skilled in the art will recognize that devices 54 may be mapped to more than one shared resource or network element.

Block 310 comprises receiving at least one default service profile. Block 310 can be performed by server 70 receiving one more service profiles 96 respective to each device 54 (from the grouping at block 305) from non-volatile storage 112 into volatile storage 116 so that service profiles 96 are accessible to processor 108.

Block 315 comprises receiving one or more default billing profiles. Block 315 can also be performed by server 70 receiving one or more billing profiles 100 (for the same devices 54 as block 310) from non-volatile storage 212 of server 74 over link 80-2.

Block 320 comprises determining if there is any active traffic over a given shared network resource corresponding to the grouping of devices from block 305. In system 50, block 320 can be implemented by server 70 receiving traffic profile data from network infrastructure in network 62 or base station 58 indicating whether or not one or more of links 84 are active. On a "no" determination at block 320, method 300 returns to block 305. A "no" determination may be reached if no links 84 (or any of the associated shared network resources) are active. In a scaled version of system 50 including a plurality of base stations, a "no" determination may also be reached if a given device 54 is no longer associated with a given base station (or any other shared resource or network element in network 62 or link 66-1) and/or has moved to coverage of another base station (or any other shared resource or network element in network 62 or link 66-1). In either event, method 300 returns to block 305 where the grouping of devices is performed a new.

A "yes" determination at block 320 lead to block 325, at which point traffic profiles for each link 84 (or for any other shared resource or network element in network 62 or link 66-1) is received. Block 320 can be performed by server 70 receiving the particulars of traffic profile data from network infrastructure in network 62 or base station 58. Such traffic profile data, it will now be appreciated, is constantly changing. The traffic profile data can be compared to corresponding service profiles. For example, where service profile 96 data includes restrictions on access to a given type of content 92, then traffic profile information at block 325 will include an identification of a type of content 92 that is being requested. Traffic profile data also includes more than the type of content 92 that is being requested, but also includes the actual data volumes, data rates and content being carried over all links 84. At this point the skilled reader is invited to recall the exemplary ranges of types of service profile 96 described above to entertain further examples of the nature of traffic profile data that can be received at block 325.

Block 330 comprises determining if the traffic profile(s) received at block 325 can be accommodated according to the service profiles. In general, block 335 includes an assessment as to whether the overall capacity of the shared network resource between devices 54 and base station 58 (or any other shared resource or network element in network 62 or link 66-1 that supports the delivery of services to devices 54) can actually accommodate the traffic profiles in a manner consistent with the service profiles.

A "yes" determination can be reached at block 330 according to this example: assume that base station 58 is capable of sending data to all devices 54 connected to base station 58 at a maximum bit rate of twenty megabits per second. Now assume that all devices 54 each have a service profile that guarantees each device 54 a maximum bit rate of five megabits per second. Now assume that each device 54 has requested content 92 that fully consumes the maximum bit rate of five megabits per second. In this example, contention will not exist, as base station 58 will be able to provide the demanded full fifteen megabits per second, which thereby leads to a "yes" determination at block 330. Those skilled in the art will recognize that traffic and service profiles can also include service or application specific attributes such as the maximum number of sessions that can be supported for a given service or application, due to, for example, processor speed or memory limitations in a given server that is transcoding the sessions. For example, a given network resource such as a media server can be determined to have a maximum capacity of supporting twenty video streaming sessions simultaneously to devices 54 irrespective of the absolute aggregate bandwidth in megabits per second. Those skilled in the art will also recognize that traffic and service profiles can also include various service or application centric parametric attributes required to achieve a given level of fidelity (e.g. latency for steaming services). Other examples of how a "yes" determination can be reached at block 330 will now occur to those of skill in the art.

A "yes" determination at block 330 leads to block 335, in which case links 84, network infrastructure within network 62, and base station 58 are managed according to service profile 96 by profile server 70, Likewise billing is managed according to billing profiles 100 by billing server 74.

A "no" determination can be reached at block 330 according to this example: assume that base station 58 is capable of sending data to all devices 54 connected to base station 58 at a maximum bit rate of twenty megabits per second. Now assume that all devices 54 each have a service profile that guarantees each device 54 a maximum bit rate of seven megabits per second. Now assume that each device 54 has requested content 92 that fully consumes the maximum bit rate of seven megabits per second. In this example, contention will exist, as base station 58 is unable to provide the demanded full twenty-one megabits per second, which thereby leads to a "no" determination at block 330. Other examples of how a "no" determination can be reached at block 330 will now occur to those of skill in the art.

A "no" determination at block 330 leads to block 340, in which case service profiles 96 or billing profiles 100 or both of them are dynamically modified to accommodate contentions that lead to the "no" determination at block 330. In the example from the previous paragraph, a modification of service profiles 96 can include automatically reducing the maximum guaranteed bit rate for one or all of devices 54 from seven megabits per second to a lower maximum guaranteed bit rate such that the contention is resolved.

A corresponding modification can be made to adjust data in the billing profile 100 to reflect a credit for the reduced maximum guaranteed bit rate.

From block 340, method 300 moves to block 335 at which point links 84 (or any other shared resource or network element in network 62 or link 66-1) are managed according to the modified service profile or billing profile or both. Those skilled in the art will recognize that a variety of means can be used to enforce or regulate traffic characteristics in the associated shared network resources including the invocation of traffic, service or policy controls via policy server 70 and links 66-2 and/or 67 as well as billing server 74 and links 66-3.

From block 335, method 300 returns to block 320 and a determination is again made whether traffic over the shared network resource is active, as previously described. Method 300 continues from block 320 as previously described. At this point it can be noted, however, that if block 340 has been invoked, and a "no" determination is reached at block 320 then the default service profile(s) and billing profile(s) will be re-established for each device 54. On the other hand, a "yes" determination at block 320 from this point can lead to ongoing management of the links 84 (or any other shared resource or network element in network 62 or link 66-1) based on the prior modification made at block 340, or further modifications can be made at block 340 to reflect changing traffic profiles as detected at block 325.

Figure 5:
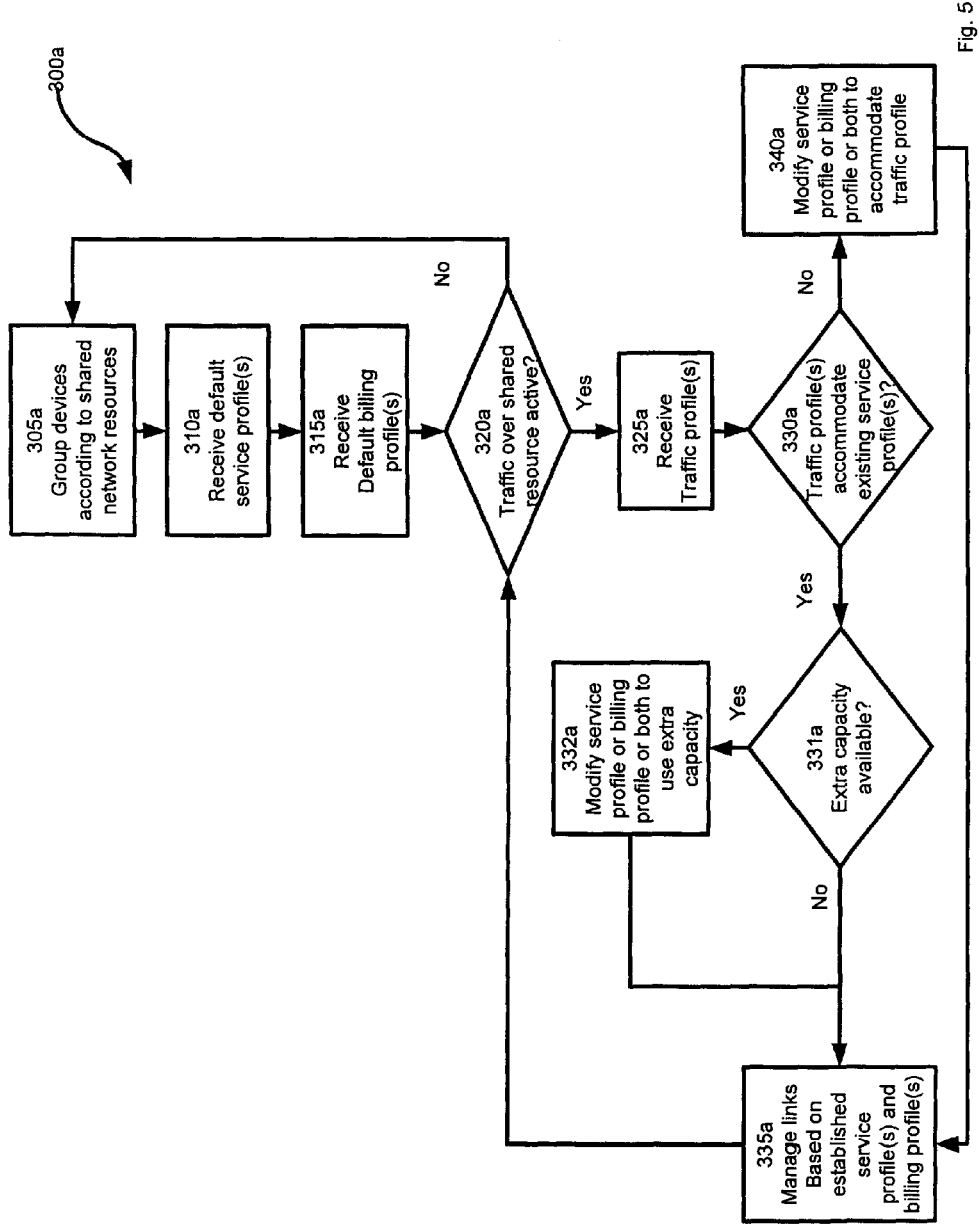
FIG. 5 shows a flow-chart depicting another method for dynamic resource allocation.

Similarly, at block 330, if block 340 has been invoked, and a "yes" determination is reached at block 330, then the default service profile(s) and billing profile(s) (or a subset thereof) can be re-established for each device 54. On the other hand, a "no" determination at block 330 from this point can lead to ongoing management of the links 84 (or any other shared resource or network element in network 62 or link 66-1) based on the prior modification made at block 340, or further modifications can be made at block 340 to reflect changing traffic profiles as detected at block 325. Another embodiment is shown in FIG. 5, which shows a flowchart depicting a method for dynamic resource allocation as indicated generally at 300a. Method 300a can be implemented on system 50 or a suitable variation thereof. Method 300a is a modification of method 300 and therefore like blocks bear like references. Of note is that method 300a includes blocks 331a and 332a. Block 331a is reached from a "yes" determination at block 330a (as described above in relation to block 330.) Block 331a comprises determining if there is extra capacity available over a given shared network resource.

A "yes" determination can be reached at block 331a according to this example: assume that base station 58 is capable of sending data to all devices 54 connected to base station 58 at a maximum bit rate of twenty megabits per second. Now assume that all devices 54 each have a service profile 96 that guarantees each device 54 a maximum bit rate of five megabits per second. Now assume that device 54-1 and device 54-2 has requested content 92 that fully consumes the maximum bit rate of five megabits per second. Now assume that device 54-n has requested content 92 that is best provided at a rate of seven megabits per second. In this example, no contention will strictly exist, as base station 58 will have excess capacity according to the service profile 96 but at the same time base station 58 will have capacity to provide seven megabits per second for device 54-n, even though device 54-n is not, by default, entitled to it. Those skilled in the art will recognize that the capacity associated with a given shared network resource can be associated with service or application specific attributes such as the maximum number of sessions that can be supported for a given service or application. Those skilled in the art will also recognize that traffic and service profiles can also include various service or application centric parametric attributes required to achieve a given level of fidelity (e.g. latency for steaming services). For example, a given network resource such as a media server can be determined to have a maximum capacity of supporting twenty video streaming sessions simultaneously to devices 54 with a high degree of fidelity or forty video streaming sessions to devices 54 with a lower degree of fidelity. Other examples of how a "yes" determination can be reached at block 331a will now occur to those of skill in the art.

A "yes" determination at block 331a leads to block 332a, which comprises modifying the service or billing profile or both to utilize the extra available capacity. Continuing with the example from the previous paragraph, service profile 96 can be modified at block 332a in order to provide a full seven megabits per second to device 54-n, thereby bringing usage of base station 58 up to seventeen megabits per second, still below the twenty megabits per second capacity. At the same time, a corresponding modification can be made to optionally adjust data in the billing profile 100 for device 54-n a charge for the increased maximum guaranteed bit rate.

A "no" determination can be made at block 331a when base station 58 (or any other shared resource or network element in network 62 or link 66-1) has no extra capacity. Block 335a is thus reached either from a "no" determination from block 331a or from block 332a. Block 335a then functions in the same manner as block 335. Note again that method 300a continually cycles while traffic over the shared resource is active, and that as traffic profiles change, service profiles or billing profiles or both can be dynamically modified according to the available capacity over a given shared resource. Those skilled in the art will recognize that a variety of means can be used to enforce or regulate traffic characteristics in the associated shared network resources including the invocation of traffic, service or policy controls via policy server 70 and links 66-2 and/or 67 as well as billing server 74 and links 66-3.

Figure 6:
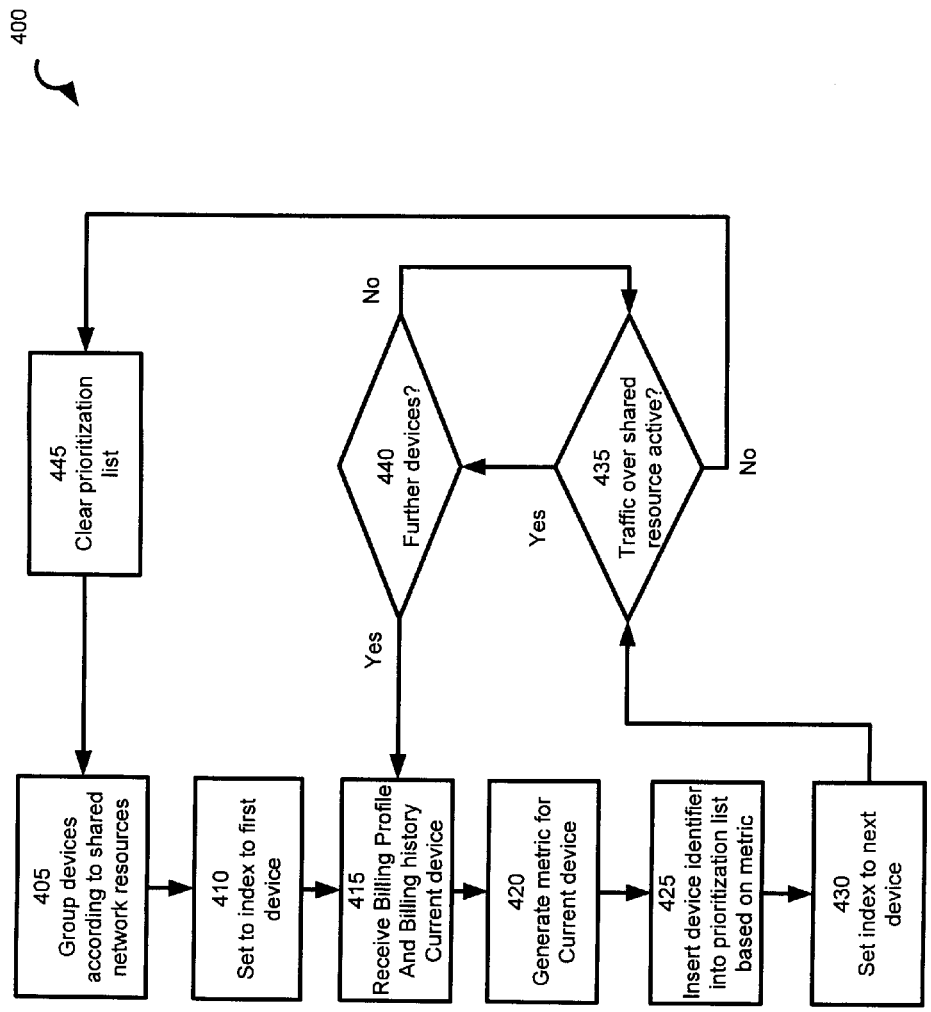
FIG. 6 shows a flow-chart depicting a method for prioritizing devices for subsequent dynamic resource allocation.

It is to be understood that there is no particular limitation on the way in which a particular device 54 is selected for utilization of excess capacity (as discussed in relation to block 332a) or is selected for reduction of service (as discussed in relation to block 340a and block 340.) However, other embodiments contemplate exemplary ways in which selection can occur. Referring now to FIG. 6, a flowchart depicting a method for prioritizing devices for subsequent dynamic resource allocation is indicated generally at 400. Method 400 can be implemented on system 50 or a suitable variation thereof. In a present embodiment, method 400 is performed by billing server 74, though in other embodiments method 400 can be performed by profile server 70.

Block 405 comprises grouping devices according to a shared network resource. Block 405 can be performed in much the same manner as block 305, whereby profile server 70 querying network elements in network 62 to ascertain which devices 54 are utilizing base station 58 (or any other shared resource or network element in network 62 or link 66-1). When method 400 is performed by billing server 74 in conjunction with profile server 70 performing method 300 or method 300a, then billing server 74 can effect block 405 by obtaining the results of performance of block 305 from profile server 70. However, profile server 70 can also perform its own version of block 305 directly.

Block 410 comprises setting an index to a first device. Based on the identification of devices 54 from block 405, at block 410 those devices 54 from block 405 are assembled into a list according to an algorithm (which may include a random selection or a selection based on an attribute associated with an absolute or relative identifier). Block 410 comprises setting an index in that list to the first device in the list.

Block 415 comprises receiving billing profile and billing history information for the currently indexed device. Thus, assume that device 54-1 is selected as the first indexed device at block 410, then at block 415 server 74 retrieves a billing history for device 54-1 (based on the absolute identifier for device 54-1 or relative identifier for device 54-1 or both). The billing history can span any predefined prior period—in months or years. Typically, more recent billing history will be selected. The billing history identifies historical charges, usage and payments (either post-paid or pre-paid) for device

54-1. Optionally as part of block 415, the billing profile 100 for device 54-1 can also be retrieved at block 415. Optionally as part of block 415, the service profile 96 can also be obtained at block 415 from server 70.

Block 420 comprises generating a metric for the currently indexed device. The metric can be generated in any manner, but for example purposes the metric can be a number between zero and one-hundred: zero indicates a "lower" metric, whereas one-hundred indicates a "higher" metric. The metric is based on a meta-analysis of the billing history, and, where provided, also the billing profile 100 and service profile 96 for the device 54. A higher metric can be generated where a device 54 shows a billing history consistent with prompt payments, or payments that exceed a certain threshold, or indicative of a longer billing history. Conversely a lower metric can be generated for a billing history consistent with slow payments, or payments below a certain threshold, or indicative of a shorter billing history. A higher metric can also be applied where a billing history indicates a "bank" of promotional rewards or airtime minutes, or bandwidth, of the type taught in currently co-owned application US20040097245, the contents of which are incorporated herein by reference. A higher metric can also be applied where a service profile 96 indicates a permission to pay for momentary increases in bandwidth or other quality of service parameters. A higher metric can be applied where a billing history indicates a usage of a particular service that is above a certain threshold. For example, high historical access of content 92 that generates advertising to a device 54 can lead to generation of a higher metric. As another example, high historical usage of device 54 for financial transactions which have service charges (such as those taught in currently co-owned application PCT/CA2008/001219 entitled Universal Financial Transaction Architecture based on Telecommunication Infrastructure) can lead a generation of a higher metric. A lower metric can also be applied where a service profile 96 indicates a permission to receive credits in exchange for momentary decreases in bandwidth or other quality of service parameters. A lower metric can be automatically assigned to a pre-paid account with a lower pre-paid balance, (i.e. where the balance is sufficiently low that no significant amount of content 92 could be delivered within the remaining balance.) Other examples of how higher or lower metrics can be generated at block 420 will now occur to those skilled in the art.

Block 425 comprises inserting a device identifier for the currently indexed device into a prioritization list based on, and including, the metric generated at block 420. For the first device, that device will simply be placed as the first device 54 on that prioritization list. For other devices 54 during subsequent cycling of method 400, those devices 54 will be placed on the prioritization list relative to other devices 54 according to the metric assigned to those devices. For devices 54 having the same metric, a conflict resolution policy can be employed, such as automatically placing the most recently examined device 54 at a location higher on the prioritization list.

Block 430 comprises setting the index first established at block 410 to the next device. Block 435 comprises determining if there continues to be active traffic shared over a given network resource. The determination at block 435 is much like the determination at block 320, and indeed server 70 and server 74 can cooperate on the determinations made at block 320 and block 430. A "no" determination at block 435 leads to block 445 where the prioritization list is cleared and then back to block 405.

A "yes" determination at block 440 leads to a determination if there are other devices in the index referenced at block 410. If there are further devices (i.e. a "yes" determination at block 440) then method 400 cycles back through blocks 415, 420, 425, 430 and 435. A "no" determination at block 440 causes method 400 to cycle back through block 435.

The prioritization list that is generated through various cycles through block 425 can then be used at block 340 or block 340a or block 332a or all of them. Devices 54 that are higher in the prioritization list will be the first eligible for receiving additional capacity at block 332a. Devices 54 that are lower in the prioritization list will be the first that have their service profiles 96 reduced at block 340 or block 340a.

As a variation method 400, the prioritization metric generated using block 415 and block 420 can be generated on a continuous basis, such that method 400 is modified to remove block 415 and block 420 and only a prioritization list at block 425 is generated for any given grouping of devices that are sharing a given network resource.

As a further variation of method 400, block 415 can be replaced with, or include, a gathering of usage history for a particular device during a similar time period, to assist in predicting whether that same device is likely to continue to requiring high demand during subsequent iterations of block 325 or block 325a.

The foregoing discusses certain specific embodiments, but it is to be understood that variations, subsets, and combinations of those embodiments are contemplated. The claims attached hereto define the scope of monopoly. For example, the functionality of policy server 70 and billing server 74 can be merged. However, in the present embodiment they are separated to reflect currently common network deployments and standards. Furthermore, the teachings of method 300, method 300a and method 400 can be implemented in policy server 70 or billing server 74 or both of them, using links 80 to exchange data. It can be desired to have instances of each method 300, method 300a or method 400 or all of them operating in each of policy server 70 and billing server 74 for load balancing or redundancy, with each instance in communication with the other. It can be further desired to implement method 300, method 300a or method 400 in hardware that is completely separate from policy server 70 and billing server 74. In this variation, policy server 70 and billing server 74 can be based on a known policy server 70 and a known billing server 74 that is defined according to one or more telecommunication standards. The separate hardware can be designed to use existing programming interfaces in the known policy server 70 and the known billing server 74 that are normally used for configuration via customer service representative using customer service terminal, where by the separate hardware dynamically modifies service profiles 96 and billing profiles 100. This allows a retrofit of the teachings herein onto an existing network, without requiring material modification to the existing network.

Those skilled in the art will recognize that the system, apparatus, and method for dynamic resource allocation can be applied in other domains of services 792 such as energy (e.g. electricity) or resource (e.g. water, gas) distribution networks or data (e.g. land line Internet connections) where the cumulative demand of end devices or terminals can exhaust the finite capacity of a given resource or element associated with the delivery of energy products, services, or resources. Referring now to FIG. 7, a system with a feedback loop for dynamic resource allocation for a utility distribution network is indicated generally at 701. Service 792 is accessible to devices 754 via network 762 and distribution station 758. In a given embodiment system 701 comprises a plurality of meters 754-1, 754-2 . . . 754-n (collectively, meters 754, and generically, meter 754) that monitor the consumption of a given service to a given end point. Each meter 754 can thus include a basic microcomputer configurations such as that discussed above in relation to any of device 54, or server 70 or server 74, while including a conduit to carry the given service 792 and measure and/or throttle consumption thereof. For example, in a water or gas context, the conduit can be piping suitable for carrying water or gas, and the conduit can include a transducer that feeds to the microcomputer to indicate consumption profiles. In an electricity context, the conduit can be high-voltage wiring with a combination amp-meter and voltmeter tapping the wiring in order to monitor consumption profiles of electricity.

A bearer path 784 is used to link distribution station 758 with each meter 754. Not shown is a distribution link between the distribution station 758 and a given end-point for which a given meter 754 is used to monitor and optionally effect policy instructions. At least one distribution station 758 interconnects meter 754 and a network 762. A first link 766-1 connects distribution station 758 to network 762. A second link 766-2 connects network 762 to a policy server 770 and a third link 766-3 connects network 762 to billing server 774. Policy server 770 is also configured to send policy data to billing server 774 via a first link 780-1 and to receive billing data from billing server 774 via a second link 780-2. Policy server 770 is also configured to receive resource utilization data from and send policy instructions to network elements in network 762 via link 766-2. Policy server 770 is also configured to receive resource utilization data from and send policy instructions to distribution station 758 via link 767. Meters 754 are optionally configured to receive policy instructions or send utilization data to policy server 770 via links 784 (and network 762) or via separate communication links (not shown). Meters 754 are optionally configured to receive billing instructions or send utilization data to billing server 774 via links 784 (and network 762) or via separate communication links (not shown). Billing server 774 is also configured to receive resource utilization data from and send instructions to network elements in network 762 via link 766-3. It should be noted that links 780 can be implemented via a single physical connection, but are illustrated as logically separate for ease of description of the teachings herein. It should also be noted that the functionality accorded by link 767 can be implemented via link 766-1, network 762, and link 766-2 but are illustrated as logically separate for ease of description of the teachings herein.

With reference to FIG. 7, those skilled in the art will recognize the system, apparatus, and method for dynamic resource allocation can be applied to detect and regulate the consumption of services throughout the distribution network in a manner that mitigates the potential of exhaustion at a given point within the distribution network given the consumption and service profiles associated with a given end point as monitored by meters 754.

It is to be understood that various aspects of the foregoing methods can be stored on computer-readable media that, when read by computing devices, causes those computing devices to execute according to those methods.

While certain specific embodiments have been discussed, it is to be reiterated that such embodiments are non-limiting examples and that variations, subsets and/or combinations of them are contemplated. The scope of the monopoly sought is defined by the claims attached hereto.

The invention claimed is:

1. A method for dynamic allocation of network resources comprising:
  receiving a service profile for each of a plurality of devices sharing a network resource;
  receiving a billing profile for each of said plurality of devices;
  generating a prioritization list defining an order of said plurality of devices, based on said billing profiles and on a billing history for each of said plurality of devices;
  repeating:
    receiving traffic profiles over said network resource for said plurality of devices;
    managing said network resource according to said service profile and said billing profile if said network resource is fully utilized by said traffic profiles; and,
    selecting at least one of said devices based on said prioritization list and
  dynamically modifying at least one of said service profile and said billing profile for said selected devices, if said network resource is under-utilized by said traffic profile or if said network resource would be over-utilized by said traffic profiles;
  until said plurality of devices no longer continue to share said network resource; and
  when said plurality of devices are no longer sharing said network resource, clearing said prioritization list.

2. The method of claim 1 wherein said dynamically modifying comprises increasing or reducing an overall bit-rate cap or data volume cap in a service profile for at least one of said devices.

3. The method of claim 2 wherein said dynamically modifying further comprises increasing or decreasing a rate or a charge in a billing profile for said at least one of said devices.

4. The method of claim 1 wherein one of said devices at a first end of said list is a first device to be subject to said dynamically modifying if said network resource would be under-utilized by said traffic profiles.

5. The method of claim 4 wherein said dynamically modifying comprises increasing an overall bit-rate cap or data volume cap for said one of said devices at said first end of said list.

6. The method of claim 5 wherein said increasing fully utilizes a remainder of a capacity of said network resource.

7. The method of claim 1 wherein one of said devices at a first end of said list is a first device to be subject to said dynamically modifying if said network resource would be over-utilized by said traffic profiles.

8. The method of claim 7 wherein said dynamically modifying comprises decreasing an overall bit-rate cap or data volume cap for said one of said devices at said first end of said list.

9. The method of claim 8 wherein said decreasing brings said traffic profiles into alignment with full utilization of a capacity of said network resource.

10. An apparatus for dynamic allocation of network resources comprising:
  a network interface configured to receive a service profile for each of a plurality of devices sharing a network resource and to receive a billing profile for each of said plurality of devices; and
  a processor connected to said network interface and configured to generate a prioritization list defining an order of said plurality of devices, based on said billing profiles and on a billing history for each of said plurality of devices;
  said processor further configured to repeat:
    receiving traffic profiles over said network resource for said plurality of devices;
    managing said network resource according to said service profile and said billing profile if said network resource is fully utilized by said traffic profiles; and, selecting at least one of said devices based on said prioritization list and dynamically modifying at least one of said service profile and said billing profile for said selected devices, if said network resource is under-utilized by said traffic profile or if said network resource would be over-utilized by said traffic profiles;

until said plurality of devices no longer continue to share said network resource; and said processor further configured, when said plurality of devices are no longer sharing said network resource, to clear said prioritization list.

11. The apparatus of claim 10 wherein said dynamically modifying comprises increasing or reducing an overall bitrate cap or data volume cap in a service profile for at least one of said devices.

12. The apparatus of claim 11 wherein said dynamically modifying further comprises increasing or decreasing a rate or a charge in a billing profile for said at least one of said devices.

13. The apparatus of claim 10 wherein one of said devices at a first end of said list is a first device to be subject to said dynamically modifying if said network resource would be over-utilized by said traffic profiles.

14. The apparatus of claim 10 wherein one of said devices at a first end of said list is a first device to be subject to said dynamically modifying if said network resource would be under-utilized by said traffic profiles.

15. The apparatus of claim 10 wherein said apparatus is incorporated into a policy server that connects to said devices via a public land mobile network infrastructure.

16. The apparatus of claim 10 wherein said apparatus is incorporated into a billing server that connects to said devices via a public land mobile network infrastructure.

17. The apparatus of claim 10 wherein said network interface is configured to connect to a policy server and a billing server that are each connectable to said devices via a public land mobile network infrastructure.

* * * * *